(No Model.) 5 Sheets—Sheet 1.

W. H. BEEHLER.
INSTRUMENT FOR TAKING NAUTICAL OBSERVATIONS.

No. 464,261. Patented Dec. 1, 1891.

Witnesses,
J. H. Kruse
H. C. Lee.

Inventor,
William H. Beehler
By Dewey & Co.
att'ys (No Model.)
5 Sheets—Sheet 2.
W. H. BEEHLER.
INSTRUMENT FOR TAKING NAUTICAL OBSERVATIONS.
No. 464,261. Patented Dec. 1, 1891.
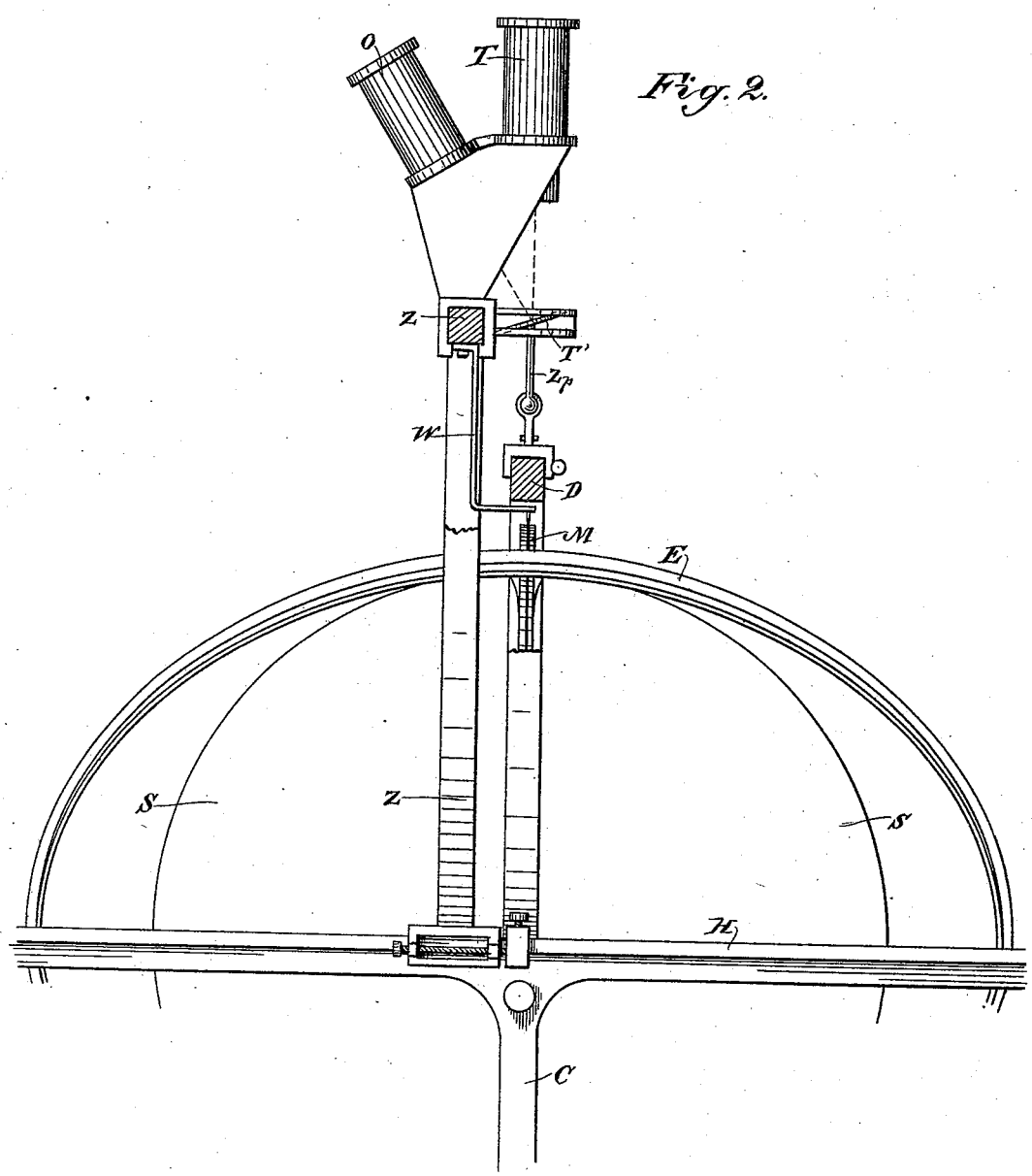
Fig. 2.
Fig. 3.
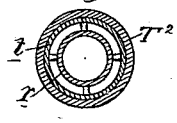
Witnesses
Inventor
William H. Beehler
By Dewey & Co.
Attys (No Model.) 5 Sheets—Sheet 4.
W. H. BEEHLER.
INSTRUMENT FOR TAKING NAUTICAL OBSERVATIONS.

No. 464,261. Patented Dec. 1, 1891.

Witnesses,
J. H. Nourse
H. F. Ascheck

Inventor,
William H. Beehler
By Dewey & Co.
Atty (No Model.) 5 Sheets—Sheet 5.
W. H. BEEHLER.
INSTRUMENT FOR TAKING NAUTICAL OBSERVATIONS.
No. 464,261. Patented Dec. 1, 1891.
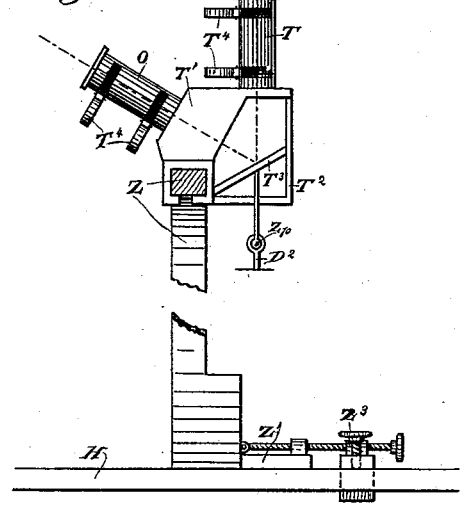
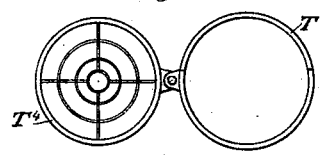
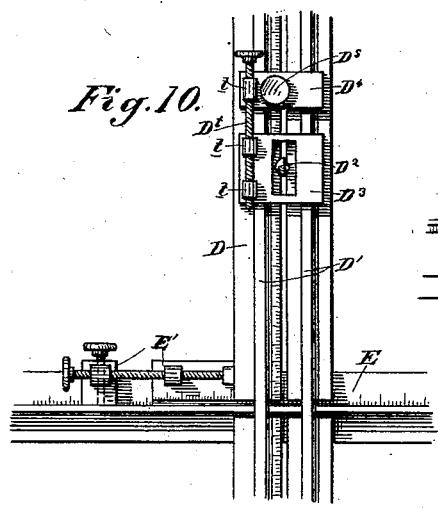
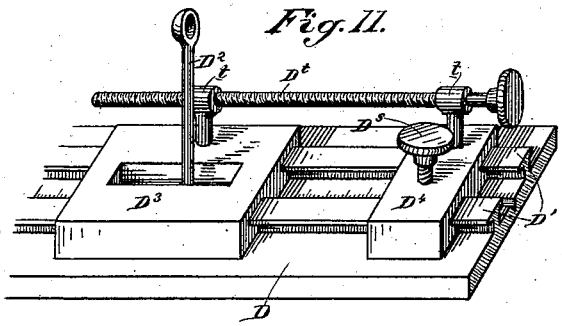
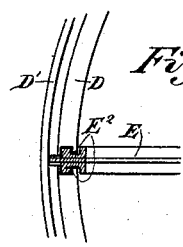
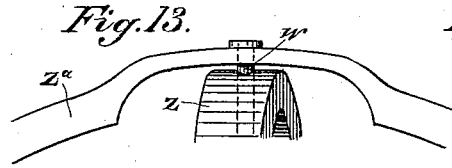
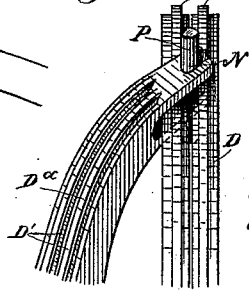
Witnesses:
Inventor,
William H. Beehler
By Dewey & Co.
atty

UNITED STATES PATENT OFFICE.

WILLIAM H. BEEHLER, OF BALTIMORE, MARYLAND.

INSTRUMENT FOR TAKING NAUTICAL OBSERVATIONS.

SPECIFICATION forming part of Letters Patent No. 464,261, dated December 1, 1891.

Application filed August 7, 1890. Serial No. 361,375. (No model.)

*To all whom it may concern:*

Be it known that I, WILLIAM H. BEEHLER, a citizen of the United States, residing in the city of Baltimore, State of Maryland, have invented an Improvement in Instruments for Taking Nautical Observations; and I hereby declare the following to be a full, clear, and exact description of the same.

My invention relates to an instrument for taking observations of celestial bodies and to solve problems in practical nautical astronomy.

It consists in certain details of construction, which will be more fully explained by reference to the accompanying drawings, in which—

Figure 1:
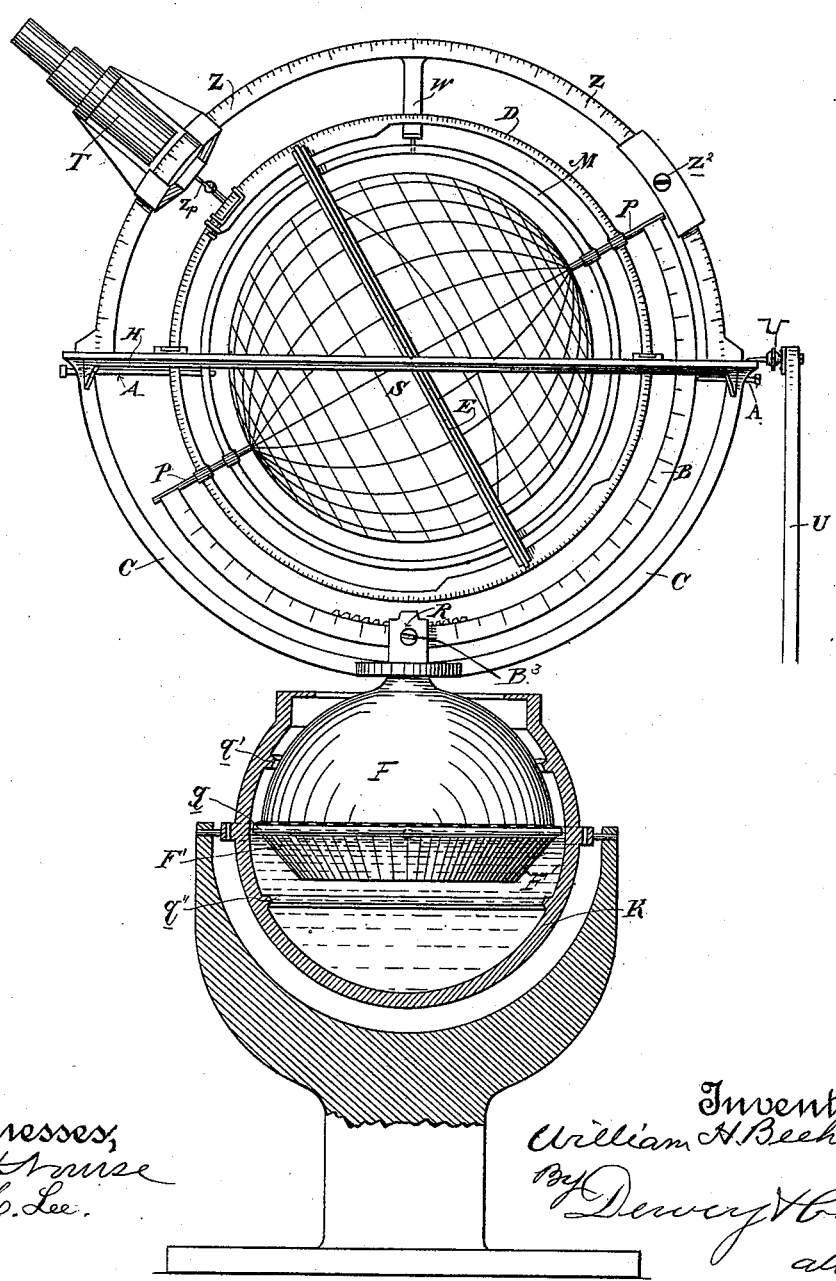
Figure 4:
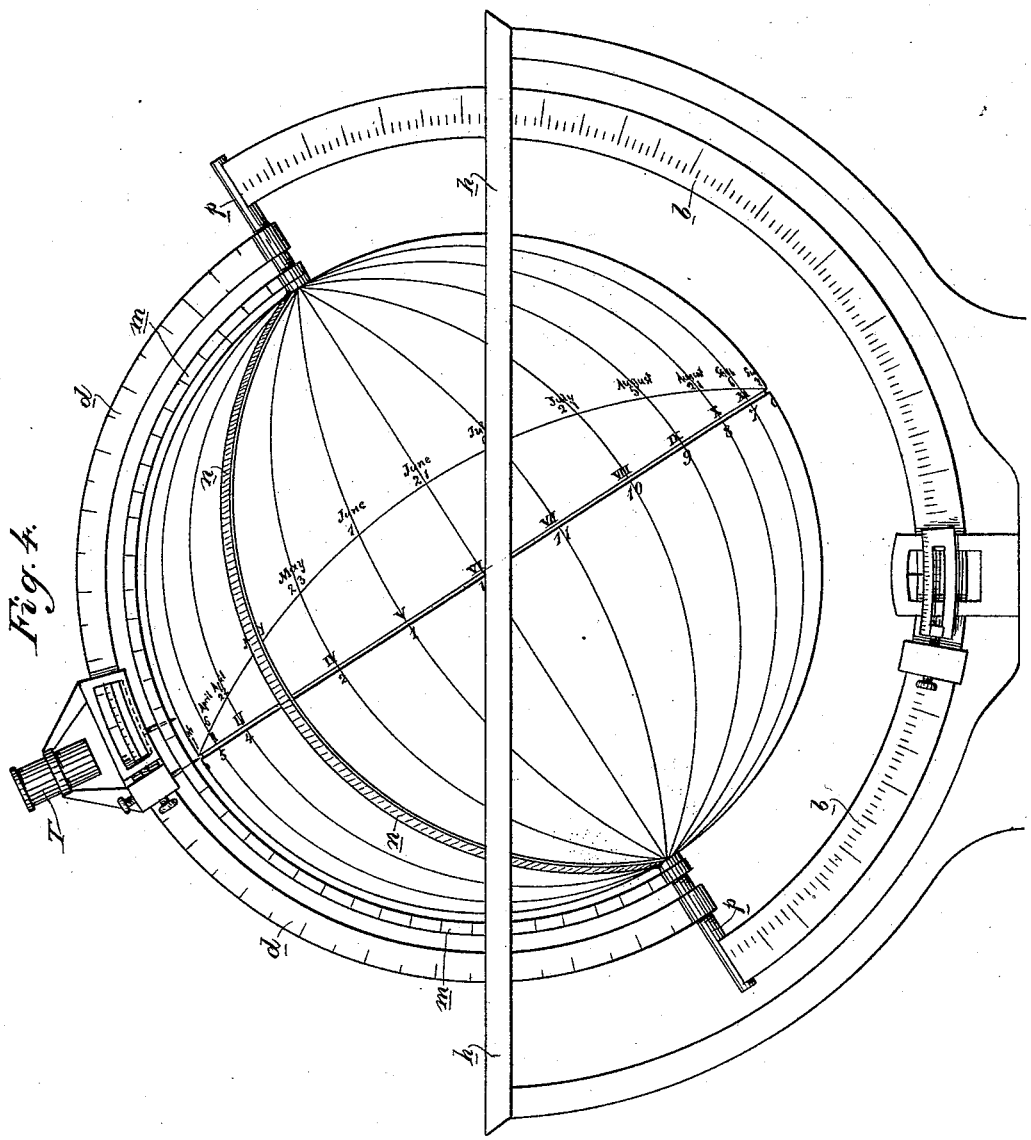
Figure 5:
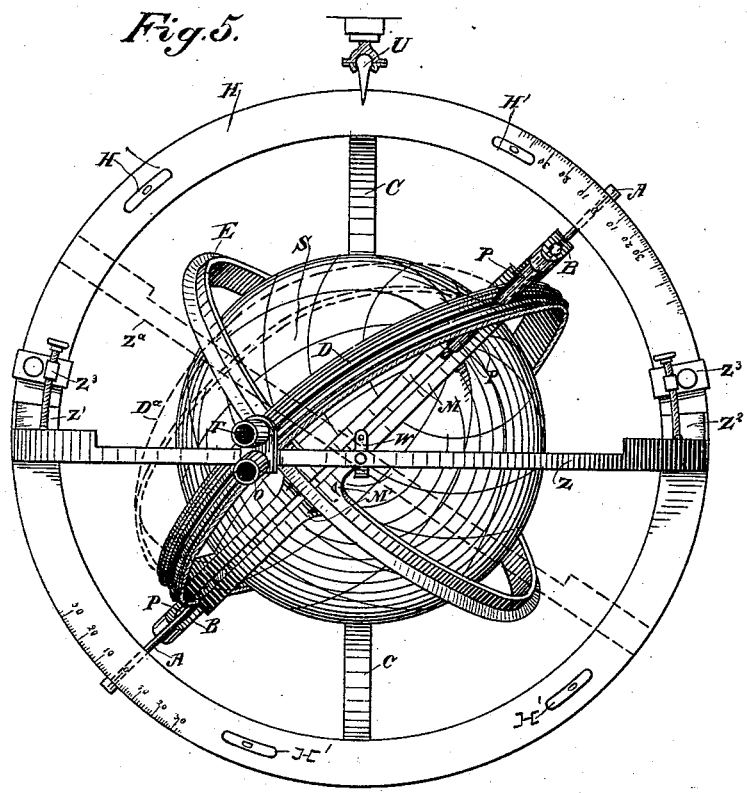
Figure 6:
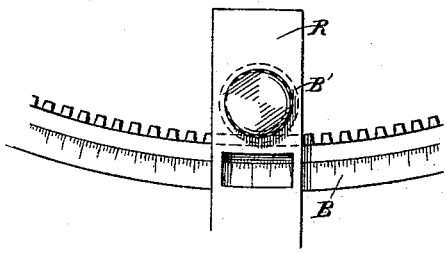
Figure 7:
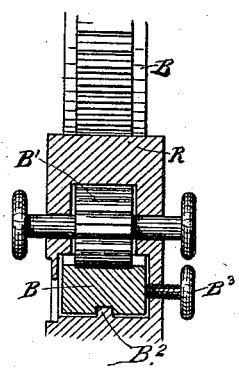

Figure 1 is a side elevation of my apparatus. Fig. 2 is a view taken at right angles with Fig. 1, and showing part of the artificial horizon, declination, and meridian rings. Fig. 3 is a cross-section of a telescope for observing the sun. Fig. 4 shows a modification of my device. Fig. 5 is a plan view of the apparatus. Fig. 6 is an enlarged side view of a section of the post R and the ring B, showing the operating devices. Fig. 7 is a transverse section of the same. Figs. 8 and 9 are enlarged details of the telescopes or observing-tubes and their connections. Figs. 10, 11, and 12 are enlarged details of the equatorial and declination rings at their points of junction, showing also the verniers. Figs. 13 and 14 are enlarged details of the supplemental azimuth and declination rings.

I have designated this instrument as a "solarometer"—"measures with the sun."

It consists of a stand supporting a constant level base, which sustains a system of concentric sphere-rings and fittings.

H H is a flat graduated ring supported upon the brackets C C, which have their lower ends attached to and supported by the rod or post R. This ring H is supported so that it is constantly level and is therefore an artificial horizon, and the center of this ring is in the prolongation of the axis of the rod R. This ring is fitted with four spirit-level bulbs H', countersunk in its face, and these indicate any deviation from the true level. The rod R projects vertically upward from a float F', which is supported in mercury contained in a spherical bowl K. This bowl is supported by gimbals upon the upper end of an upright post or pillar which is secured to the deck of the vessel, and by these means the motions of the vessel are prevented from communicating themselves to the apparatus, which is supported from the floor. The bowl K is made spherical to a point about two-thirds of its diameter, the upper one-third being cut away to form an opening or mouth whose edges terminate in a short vertical cylindrical extension with a flat rim or lip. The float is hemispherical in the upper portion and has a flat circular bottom with re-entering curved edges, and, with its superincumbent weight, its displacement of mercury is such that when the bowl is level the flat surface of the bottom of the float lies below the horizontal central plane of the hemisphere and parallel therewith. Rings $q$ upon the outer surface of the float and $q'$ and $q^2$ upon the inner surface of the bowl at equal distance above and below the center limit the inclination of the float with respect to the horizontal central plane of the bowl. These rings, together with the short cylindrical extension at the mouth of the bowl, constitute a fermeture to keep the mercury in the bowl in case of extraordinary violent heeling of the ship. If this should occur to such an extent as to bring these rings into contact, no observation should be taken with the apparatus, because it would not be perfectly level. The greater portion of the heeling effects caused by the motion of the ship is annulled by having the apparatus secured amidships and by the gimbal-supports of the spherical bowl. The mobility of the mercury insures an accurate level flotation for the flat surface of the bottom of the float. The rod or post R is fixed in the exact vertical line above the center of the float, and the lower ends of the arms C are attached to the rod by means of a ring upon the upper end of the rod, as shown in Fig. 1.

B B is a flat vertical ring, which forms a polar bracket. It is a semicircle, having bearing-surfaces at its ends one hundred and eighty degrees apart to support the polar axis P P. This semicircular flat ring B has the center of its curvature in the exact vertical line of the prolongation of the axis of the rod R. This center is also the common center of the entire system of dependent rings and sphere. This ring B is graduated into degrees and fractions from zero to ninety degrees upon each side, as shown in Figs. 1 and 6. It fits into a slot in the top of the rod R and has its interior curved edge formed into ratchet-teeth, which are engaged by a pinion B', mounted upon a shaft extending through the slotted upper end of the rod R and having disks upon the outer ends, so that by turning these disks and shaft the pinion which engages the ratchet-teeth will act to move the ring B in one direction or the other within the slot, and thus either pole of the sphere may be elevated while the other is correspondingly depressed. The lower outer edge of the ring B has a slot made in it which forms a keyway or guide for a rib which projects upwardly from the bottom of the slot in the rod R, as shown at B², Fig. 7. Near the extremities of the ring B this slot is cut entirely through the ring, and the pins A, which extend under the horizon-ring H, as shown in Fig. 1, have their ends entering into this open slot. By this construction the ring B is held so that the axis of the poles P lies in a plane passing through the zero-points of the graduated horizon-ring H. A set-screw B³ fits into the side of the rod R, and by this means the ring B may be clamped in any position to which it has been moved by aid of the thumb-screws and pinion B', as before described.

S is a sphere of any suitable light material, having upon its surface a graphical representation of the fixed stars and the different constellations. It has also meridian-lines, equator, and parallels and the ecliptic is marked upon its surface. This sphere is supported to revolve with the polar axis having bearings at each end in the polar bracket, as shown at P. The center of this sphere is the exact center of all the surrounding rings, and is, as before stated, in exact prolongation of a central vertical line through the float and the rod R.

M M is a ring, which is a narrow segment of a sphere concentric with the stellar sphere S and of slightly greater diameter. It is supported upon the polar axis of the sphere S S, and is free to revolve over the surface of the sphere. This ring is called the meridian-ring, and may be moved so as to stand in the plane of any of the meridians of the sphere. It has a longitudinal slot in the center of its outer surface, and one of the pins A, which projects beneath the horizon-ring H and engages the slot in the polar bracket B, also enters the slot in the ring M. The pin at the lower end of the bent arm W, depending from the azimuth circle Z, to be hereinafter described, also enters the slot in the ring M, and these pins serve to confine the meridian-ring M in such a position that the vertical plane of the center of its longitudinal slot occupies the position of the observer's local meridian. The slot in the meridian-ring and that in the outer ends of the polar bracket B are in the same plane. The slot in the polar bracket is cut through at sixty-five degrees from each pole to enable the pins A to pass through it and into the slot in the meridian-ring when the pole is elevated.

In practice it will not be necessary for the instrument to serve in latitudes above sixty-five degrees north or south, and this is the reason for limiting the slot to that distance. When the observer is in zero latitude, or when the polar axis lies in the plane of the horizon-ring H, the pin A will pass through the slot in the bracket B near the polar axis; but as the pin is below the ring H the thickness of this ring carries the pin sufficiently below the polar axis to prevent its interfering with it in that direction.

E is the equatorial ring. This is also a narrow segment of a sphere concentric with the sphere S, and of slightly greater diameter than the meridian-ring M. This ring E is rigidly attached to the meridian-ring at right angles to it. Braces M' connect the two circles and serve to rigidly support the equatorial ring in a plane at right angles to that of the meridian-ring M, as shown plainly in Fig. 5. The outer surface of the ring E has a knife-edge rib which projects beyond it. This knife-edge occupies the exact plane of the great circle perpendicular to the plane of the great circle passing through the poles of the sphere S. The outer surface of the equatorial ring E is graduated into twenty-four hours, minutes, and seconds of time, with zero and twelve-hour marks at its point of intersection with the meridian-ring M. On opposite sides of the equatorial ring E are grooves E' for bearing-surfaces for the declination-ring D. (Shown plainly in Fig. 12.)

The declination-ring D is a narrow segment of a concentric sphere, and of the same diameter as the edge of the rib upon the equatorial ring before described. This declination-ring is supported upon the polar axis P, around which it is free to revolve over the surface of the sphere and over the meridian-ring M. Its middle portion, at ninety degrees from the pole, is cut and formed to fit into the grooves E' in the opposite surfaces of the equatorial ring, and elevated T rails or ribs D' projecting above its surface connect the two parts of the ring at these points where it is cut, as will be hereinafter more fully described.

The middle longitudinal line on the ring D D is marked by a slot along which the declination arc is graduated into degrees, minutes, and seconds, from zero at its intersections with the equatorial ring E to ninety degrees at the poles. The ribs or rails D' are upon each side of this slot, and extend continuously from pole to pole, connecting the two parts of the ring where separated by the projection of the knife-edge of the ring E, as before described. These ribs or rails serve to support the declination-vernier which is shown in Figs. 10 and 11. This vernier is fitted in a frame which travels on these rails D'. The graduations of the vernier are on one side of the center line are opposite the graduations of the declination-ring under the frame and which show through.

At the initial point of the vernier there is a pin $D^2$, which is perpendicular to the tangent plane of the arc D at this point. This pin carries a ball-socket at its outer end, and this receives a ball dependent at the end of the pin $Zp$, as shown in Figs. 1 and 2, which hangs down from the center of the mirror on the azimuth arc Z. The pin $Zp$ and the pin $D^2$ and the axis of the telescope or object-tube T on the azimuth arc Z Z are in mathematical line from the center of the sphere S, this line being therefore a prolongation of the radius of S.

The vernier-block $D^3$ and the tangent-block $D^4$ have T-shaped grooves made in their lower surfaces to fit the T-rails D', and a set-screw $Ds$ clamps the block $D^3$ to the surface of the declination arc D. The tangent-screw $Dt$ brings the vernier-block $D^3$ to any desired position by accurate coincidence with graduations of the declination arc D and those of the vernier-scale. The tangent screw $Dt$ is supported in movable joints upon upright posts $t$. These movable joints are screw-threaded, forming nuts through which the screw turns, and by their movement the screw will act in the direction of a tangent, while the vernier-block moves over the curved surface of the declination arc, this being the general construction of verniers as fitted to sextants. At one side of the declination-ring D there is another vernier and vernier set-block E', which works on the equatorial ring in a similar manner, as shown in Fig. 10. This marks the accurate adjustment of the declination arc D to the position where it is desired to clamp it or where it may be brought by its junction with the azimuth arc when observing a celestial body.

It will be understood that all of the verniers with set-blocks and set-screws and tangent-screws are arranged similarly to that above described to allow a movement of the parts while the screw acts in the direction of the tangent.

The azimuth and altitude ring Z is a narrow segment of a sphere of the same diameter as the ring H. It is supported vertically upon the ring H and is free to revolve in a vertical plane around a zenith-pin which is fixed to the zenith of the ring in the exact prolongation of the axis of the rod R and in the vertical line above the center of the system of rings. Shoulder-pieces $Z^2$ extend horizontally from the feet or ends of the ring Z and fit upon the ring H. These feet of the ring Z are enlarged and slide over the flat surface of the ring H. On one foot is a vernier-scale with a tangent and set-screws, as shown at $Z^3$, by which the exact position of the imaginary vertical circle Z can be read by the graduations on the ring H. One edge of the ring Z is cut away or recessed, as shown in Figs. 5 and 8, so that the exact vertical circle through the zenith to the horizon will pass through this space to one side of the ring Z, as shown by the dotted lines in Fig. 5. Upon this azimuth arc Z is supported a sliding carriage T', upon which are mounted two tubes or telescopes O and T. The axis of the telescope T is supported upon this sliding carriage in such a position that it is in the exact plane of the great circle of the sphere S, which passes through its zenith, as indicated by the dotted lines before described. The carriage supports a box $T^2$ directly beneath the telescope T, and this box contains a mirror $T^3$, fixed at an angle with the plane of the tangent of the arc Z in such a manner that the surface of the mirror makes equal angles with the axis of the telescopes T and O.

Attached to the box $T^2$ and directly in prolongation of the axis of the telescope T is the dependent pin $Zp$, having the ball-joint which connects it with the pin $D^2$, as previously described.

When the telescope T is turned toward a celestial body, the image of that body is reflected by the mirror $T^3$ and will be seen in the axis of the tube O. The exact point on the mirror $T^3$ where the axis of the telescope meets the mirror is marked by the intersection of cross-lines on the mirror. The lenses in the telescopes T and O focus the image of the body observed on the mirror.

In order to obviate the loss of light, to dispense with lenses, and to secure an observation of the center of the sun, moon, or other body and bring it accurately to the center of the observing-tube, I substitute for the telescopes T and O two tubes, which are provided with sliding leaves or shutters having central holes, so that by the use of any of these shutters the aperture may be reduced to as small a diameter as may be necessary for the purpose. These sliding leaves or shutters are plainly shown in Figs. 8 and 9 at $T^4$. They are hinged on one side, so that they may turn into or out of slots made in the side of the tube. When turned in to the full extent, the center of the leaf occupies the exact line of the axis of its tube. The center aperture of the sliding leaf is provided with two cross-hairs, made of the finest platinum wire. These wires intersect or join a central circle one millimeter in diameter, outside measurement. The wire is also joined to a second concentric ring, as shown in Fig. 9. The four sliding leaves fit in slots near the ends of the tubes T and O, one in each end of each of the tubes. The mirror is plain, without any marks, and the reflection is such that when all four of the sliding leaves are pushed into the tubes the cross-wires and rings all coincide with the shadow reflected from the mirror. If the sun be observed, its disk will appear to occupy almost the entire aperture. When the axis of the tube is in the exact direction of the center of the sun, the sun's disk will appear to be symmetrical with that of the shadow caused by the outer platinum-wire ring. If the moon be observed, its center will be in the axis of the tube T, when the curvature of the visible disk is seen to coincide symmetrically with that of the outer wire ring of the sliding leaf. If a star be observed, it will be in the direction of the axis of the tube, when the star appears to be exactly in a central inner wire ring. The shadows of the platinum wires enable observations to be taken of heavenly bodies when exactly in the direction of the axis of the tube—that is, in a line to the center of the system—or practically as if observed at the center of the earth.

In making observations of celestial bodies the sliding leaves are pushed out, so that the entire aperture of the tubes will be clear to find the celestial body with facility. When the azimuth arc is turned so near that the heavenly body is seen in the tube, it becomes necessary to make further adjustment to bring the body in the axis of the tubes. The sliding leaves $T^4$ are then pushed into the tubes and the several arcs D, E, Z, and B are turned by their tangent-screws until the body observed appears exactly in the axis of the tubes. These tubes will only be in that position for about one second of time, and it is necessary to turn the tangent-screws on E and Z accordingly to get the exact instant when the star or the center of the sun or moon is in the axis of the tubes. That instant is noted by the chronometer or watch regulated to Greenwich apparent time. The difference between this apparent time and the local hour-angle read off on the equatorial ring between the arcs D and M gives the longitude. In case of observations of the sun the hour-angle is local apparent time.

If observing a star, planet, or the moon, the local apparent time is obtained by reducing the hour-angle of the body, as observed, to that of the sun by applying the algebraic difference of the right ascensions of the sun and body observed, as given in the *Nautical Almanac*. There is no difficulty in making final adjustment with the tangent-screws on the arcs E, Z, and B. Since the declination of heavenly bodies changes very slowly, it does not require much manipulation to bring the body in position above or behind the center of the cross-wires. One or two turns of the ratchet-pinion B' moves the arc B so as to bring the tubes to the necessary elevation, which does not change in the few moments of time necessary to take observation. The tangent-screw of D on E is the only one necessary to follow the body, except it be a body which changes its azimuth very rapidly, when it is also necessary to move the tangent-screws of Z on the ring H.

In order to automatically make allowance for the effect of the refraction of the atmosphere, the curvature of the ring or arc Z is not strictly that of a segment of a sphere, but differs slightly in the shape of its outer surface.

The refraction of light is greatest when the heavenly body is at a low altitude. When in the zenith, the effect of refraction is nothing. The tube or telescope on the arc Z is therefore caused to move over an arc whose curvature changes by the amount of refraction, this curvature being produced by making the outer surface of the arc Z the curve of a circle with a constantly-changing center. This arc is constructed in accordance with the known amount of refraction which has already been calculated and compensates this refraction so that the true altitude of the body is indicated instead of its apparent altitude. I have calculated this compensation for an atmosphere at a temperature of 60° Fahrenheit and barometer thirty inches. At greater or less temperature and at different pressures there are varying effects of refraction, but this variation under abnormal conditions is chiefly at low altitudes. These low altitudes are to be avoided, not only on account of refraction, but chiefly because the instrument is located on board the ship low down, so that the rail will often render it impracticable to observe heavenly bodies at low altitudes.

$Z^2$ is an adjustable weight movable upon the azimuth-ring and fixed thereto at a point on the opposite side of the zenith-line from the telescope-carriage, so as to counterbalance the latter and maintain the horizon-ring at an exact level.

When the instrument is used for finding Greenwich mean time from lunar distances, an additional declination-ring and azimuth-ring are employed. These rings are fitted in all respects like the declination-ring D and azimuth-ring Z, with mirror, telescope, observing-tube and other parts, as hereinbefore described. The arc $Za$ is in all respects similar to the azimuth arc Z except that it is of greater diameter near the zenith, where it is enlarged to fit over the arc Z, as shown in Fig. 13. The bent arm W on the arc Z, which carries the pin in the exact plane of the azimuth, is provided with an extra piece, which carries an arm over the top of the arc Z and which fits into a slot in the highest point of the arc $Za$. This arc $Za$ rests upon the horizon-ring and has a vernier with set and tangent screws in all respects like the azimuth arc Z. The adjustable declination arc $Da$ is fitted with forked ends to fit onto the polar axis P on each side of the bearings of the permanent declination-ring D, as shown in Fig. 14. It is of the same diameter as the ring D except at its ends and it is only one hundred and eighty degrees in length from pole to pole. It has a central slot with graduations and a vernier-scale with pin-and-ball socket N to receive the dependent pin $Zp$ from the arc $Za$.

When adjusted, the arcs $Za$ and $Da$ are employed for observations of the heavenly body exactly like those of Z and D, of which they are practically duplicates in essential features. They afford means by which two observers may simultaneously take observations of two heavenly bodies visible in the heavens at the same time and not too remote from each other. Such observation indicates the lunar distance, which is measured on a graduated metal tape-line.

The distance between the verniers at the initial points on D and Da, measured on this graduated line, is the angular apparent lunar distance between the two bodies, the moon being observed on the arc Z and the sun or star at the same time on the arc Za.

The *Nautical Almanac* gives the lunar distance of heavenly bodies, and by comparing the lunar distance observed with that of the almanac the exact Greenwich time is obtained at the instant of observation. If the instant of observation is noted by a chronometer, the error of that chronometer in the Greenwich time is the difference between the time shown by the chronometer and the exact Greenwich time, and is thus ascertained from the lunar distance. The local time is found from either or both of the hour-angles made by either D or Da with the meridian-ring N. If both hour-angles give the same result, it is a check upon the accuracy of the observation.

In taking an observation of a lunar distance it must be done with the moon at such a distance from the other celestial body that either one or the other is at some distance from the zenith, so that the sliding carriages on the two azimuth arcs will not be so close together as to interfere with each other.

An upright standard is fixed in front of the solarometer in line with the keel and has an index U hinged to it, so as to rest slightly upon the edge of the horizon-ring H, and this will indicate the exact direction of the vessel's head at the instant of any observation.

Having thus described my invention, what I claim as new, and desire to secure by Letters Patent, is—

1. An apparatus consisting of a stellar sphere, an adjustable polar bracket upon which said sphere is supported, a bowl containing mercury supported upon gimbals, which in turn are supported from a fixed post, a float the submerged portion of which is in the frustum of a cone, and a post extending vertically upward from said float and having the polar bracket adjustably mounted at its upper end, substantially as herein described.

2. A spherical mercury-containing bowl suspended in gimbals which are supported from a fixed base, a cylindrical extension from the top of the bowl with an inwardly-projecting lip, rings projecting from the interior of the bowl equidistant above and below the center, and a central ring projecting from the float between the rings of the bowl, whereby the float and superposed mechanism maintain a constantly-level base and a fermeture is provided to retain the mercury in the bowl, substantially as herein described.

3. An apparatus consisting of a bowl containing mercury, a float resting in said mercury and forming a constantly-level base, a post or support extending upwardly from said float, a bracket carried thereon, an artificial horizon supported upon said bracket, a stellar sphere supported upon an adjustable polar bracket, and the meridian, azimuth, and altitude rings arranged with relation to each other and with relation to the globe, substantially as herein described.

4. An apparatus consisting of a bowl suspended upon gimbals and containing mercury, a float adapted to rest in the mercury in said bowl, a polar bracket supported and adjustable from said float, a stellar sphere suspended upon said bracket, a horizon and meridian circles, and an azimuth-ring, in combination with a mirror, a sliding carriage adjustable upon the azimuth-ring, a telescope mounted upon said carriage, and an observing-tube mounted upon the same carriage and with such relation to the telescope as to cause the lines of the axes of the telescope and observing-tube to meet the surface of the mirror at equal angles, substantially as herein described.

5. The suspended bowl and float, the horizon-ring supported therefrom, in combination with the adjustable polar bracket, a stellar globe suspended therefrom, the azimuth circle, with the movable carriage, telescope, and observing-tube and mirror supported at the junction of the axis of the observing-tube and telescope, a declination-ring having a vernier-scale, and a socket-tube to receive a pin-bolt attached beneath the mirror in line of a radius of the astronomical vertical circle, substantially as herein described.

6. The suspended bowl containing mercury and the float resting therein, the adjustable polar bracket, stellar globe suspended therefrom, horizon, meridian, and declination rings, and an azimuth-ring the curvature of which varies from that of a circle, so that as the sliding carriage of the telescope-mount is moved upon the azimuth-ring the axis of the telescope will be deviated from the prolonged radius of the astronomical vertical circle to compensate for the apparent variation caused by the refraction of the atmosphere, substantially as herein described.

7. The suspended bowl and float, the adjustable polar bracket and stellar sphere, the azimuth-ring, a sliding carriage moving thereon and carrying a telescope, in combination with an inner tube having the same axis with the telescope, and the concentric band adapted to throw shadows of concentric circles upon the mirror when a celestial body is observed having a visible diameter and for the purpose of adjusting the telescope to the exact center of said body, substantially as herein described.

8. The combination of concentric rings in segments of concentric spheres of different diameters, the declination-ring, and an equatorial concentric ring upon which the declination-ring is adapted to move or revolve, and a central sphere suspended upon an adjustable polar axis and supported in a constantly-horizontal position, said rings being adjustable with relation to the central sphere and its polar axis and with relation to the plane of the horizontal ring, substantially as herein described.

9. An apparatus consisting of a stellar sphere, exterior concentric graduated rings, and spherical segments having a common center therewith, a spherical mercury-containing bowl with gimbals upon which it is supported from a fixed post, and a float supported in the mercury and having a post upon which the sphere, segments, and circles are adjustably supported, whereby observations at sea may be taken independent of the visibility of the sea-horizon, substantially as herein described.

10. The sphere, graduated rings and circles, and a horizontal ring supported upon a float so as to form a constant level base, in combination with the hinged index-hand attached to a vertical support in the vertical plane of the keel of a vessel and in front of said apparatus, whereby the bearing of the ship's head may be indicated by the graduations upon the horizon-ring of the apparatus at the instant of any observation, substantially as herein described.

11. An apparatus consisting of a suspended bowl containing mercury, a float adapted to rest in the mercury in said bowl and a support on said float, an adjustable polar bracket, a sphere suspended therein, graduated rings or circles, and segments of concentric spheres supported with relation thereto, in combination with one or more azimuth and declination rings, carriages adjustable thereon, and one or more telescopes and observing-tubes mounted and adjusted upon the apparatus, so that simultaneous observations of two or more celestial bodies may be obtained from the single apparatus, substantially as herein described.

12. An apparatus consisting of a stellar sphere, a fixed or an adjustable polar bracket upon which said sphere is supported, graduated rings or circles adjusted with relation thereto and a constant level base or support, and a mirror mounted upon a great circle of the sphere and interrupting the line of sight upon the surface of the sphere, whereby an observation of celestial bodies is taken as if from the exact center of the earth, substantially as herein described.

In witness whereof I have hereunto set my hand.

WILLIAM H. BEEHLER.

Witnesses:
JAS. G. GREEN,
J. G. FUNKES.